March 22, 1932. F. DI TRAPANI 1,850,744
BRAKE AND GAS CONTROL FOR AUTOMOBILES
Filed April 3, 1931   2 Sheets-Sheet 1
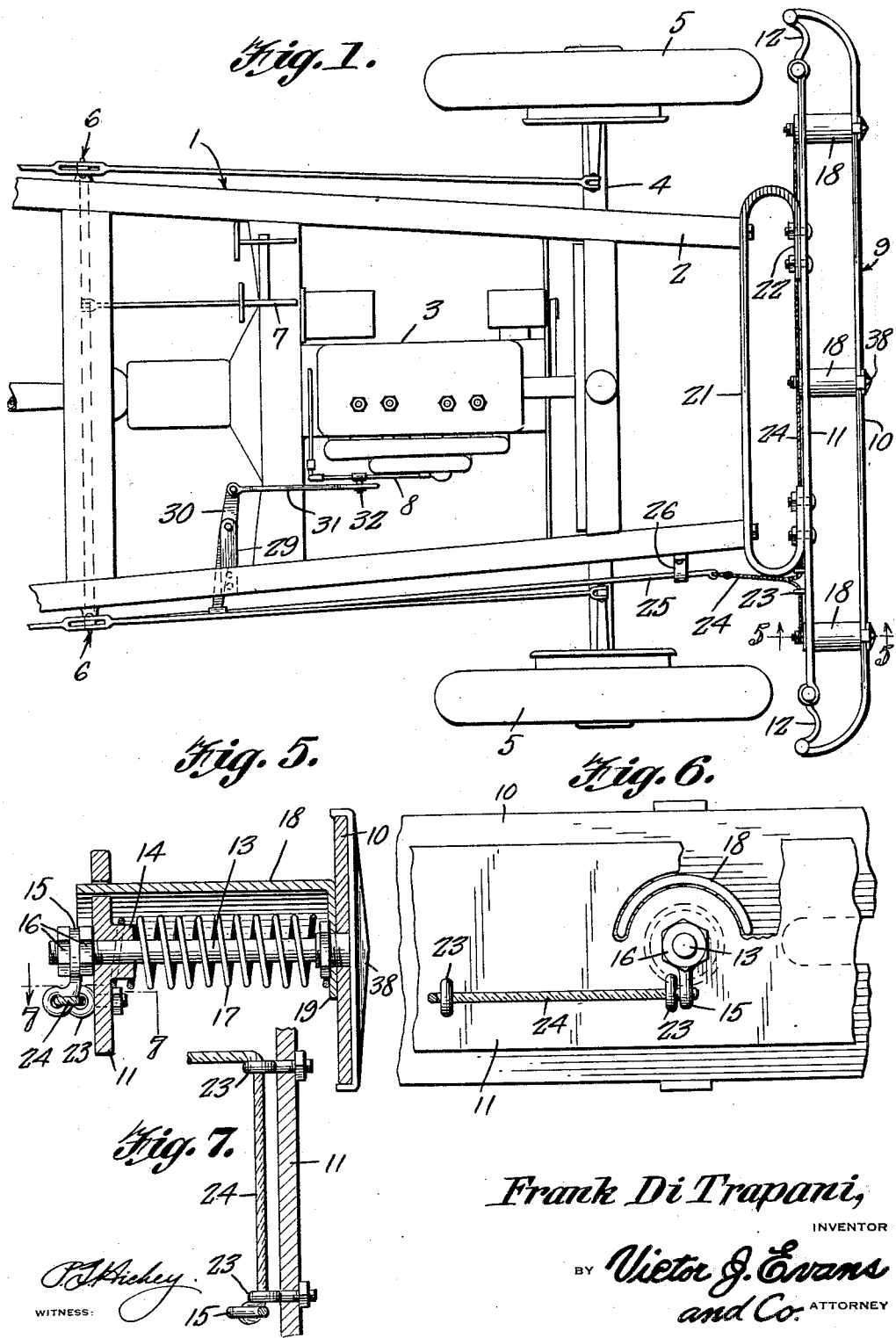
Frank Di Trapani,
INVENTOR
BY Victor J. Evans and Co. ATTORNEY

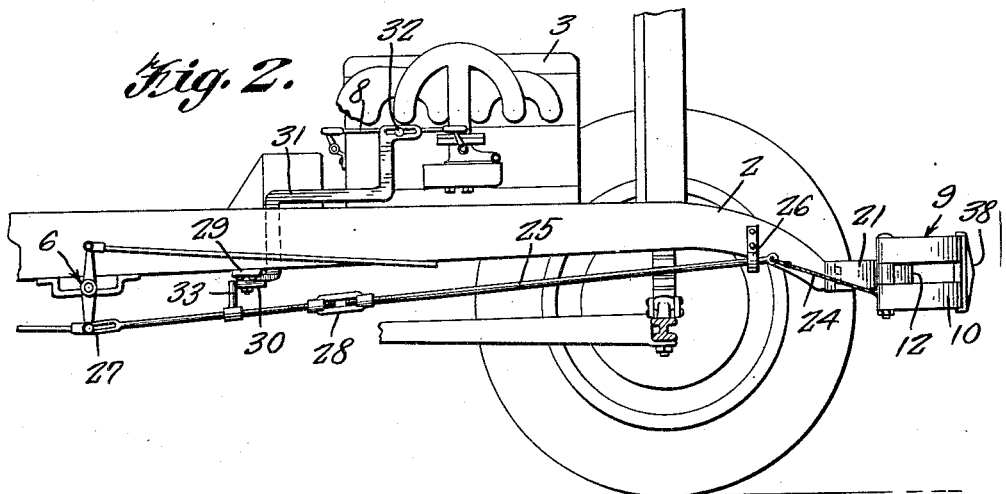
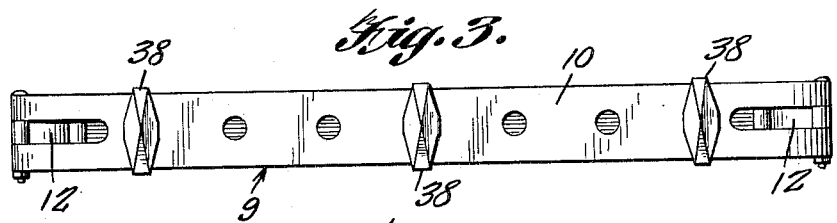
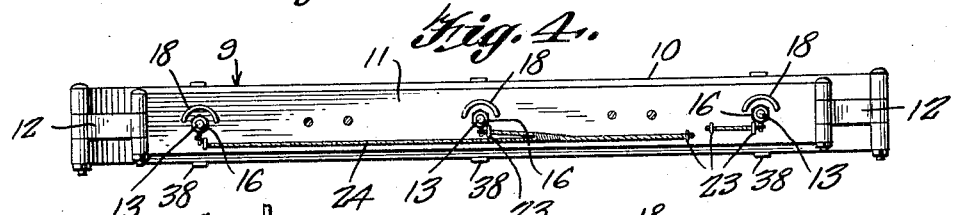
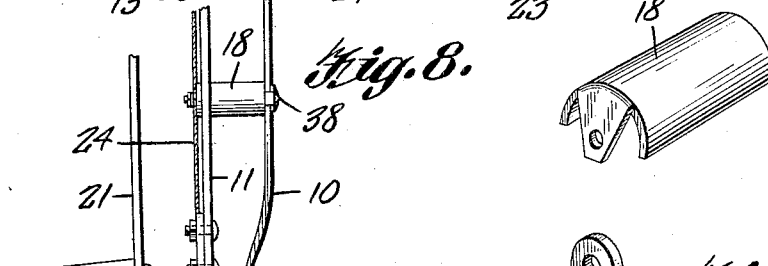
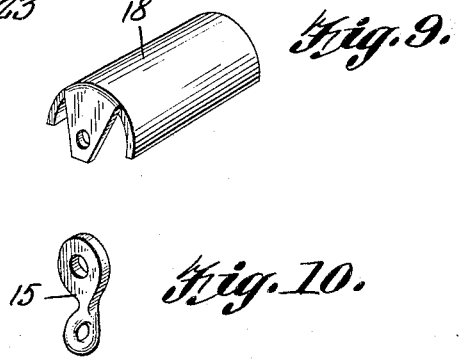

Patented Mar. 22, 1932

1,850,744

UNITED STATES PATENT OFFICE

FRANK DI TRAPANI, OF BOSTON, MASSACHUSETTS

BRAKE AND GAS CONTROL FOR AUTOMOBILES

Application filed April 3, 1931. Serial No. 527,556.

This invention relates to brake and fuel controls for automobiles and has for the primary object, the provision of a device of the above stated character whereby an impact to the automobile will automatically apply the brakes and close the fuel throttle of the engine to reduce the serious results of accidents to a minimum, caused by the automobile colliding with other objects.

Another object of this invention is the provision of means associated with the bumper of the automobile and connected to the brakes and throttle of the engine that will automatically apply the brakes and close the throttle by an impact against any part of the bumper.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view illustrating a portion of an automobile with my invention applied thereto.

Figure 2 is a fragmentary side elevation illustrating the same.

Figure 3 is a front elevation illustrating the bumper.

Figure 4 is a rear elevation illustrating the same.

Figure 5 is a sectional view taken on the line 5—5 of Figure 1.

Figure 6 is an enlarged fragmentary rear view of the bumper with the operating cable associated therewith.

Figure 7 is a fragmentary sectional view taken on the line 7—7 of Figure 5.

Figure 8 is a fragmentary plan view illustrating the bumper engaging an obstacle.

Figure 9 is a perspective view illustrating a cover.

Figure 10 is a similar view illustrating a clip.

Referring in detail to the drawings, the numeral 1 indicates a fragmentary portion of an automobile in which the chassis 2 is shown as supporting the engine 3 and having the front axle 4 on which the front wheels 5 are journalled. The chassis 2 has associated therewith the usual brake rigging 6 operated through the medium of a foot pedal 7. The speed of the engine 3 is controlled by a throttle rod 8. The foregoing description relates to a well known construction of automobile to which my invention is applied.

A bumper 9 is associated with the front end of the chassis 2 and includes inner and outer bars 10 and 11 pivotally connected at their ends by spring elements 12. As shown in Figure 1 the outer bar 10 is of a greater length than the inner bar 11 and has its ends curved rearwardly and terminating in substantial parallelism with the bar 11 and connected thereto by the spring elements 12 which have pivotal connection to both of the bars 10 and 11.

Rods 13 are detachably secured to the outer bar 10 at spaced intervals and are slidably received through bearings 14 formed on the inner bar 11 and have secured thereto clips 15 by nuts 16. Expansion springs 17 are mounted on the rods 13 between the inner and outer bars 10 and 11 for the purpose of urging said bars away from each other. Semi-cylindrical shaped covers 18 are disposed over the springs 17 and rods 13 and have formed on one of their ends apertured ears 19 that receive the rods 13 and bear against the inner face of the outer bar 10 while the opposite ends of the covers slide through arcuate shaped slots 20 formed on the inner bar 11.

A bracket 21 is secured to the front end of the chassis 2 and has its ends bent upon themselves to provide spaced resilient attaching portions 22 which are bolted or otherwise secured to the inner bar 11 for cushioning and attaching the bumper to the chassis.

The inner bar 11 is provided with a plurality of guide loops 23 through which pass flexible cables 24 that are connected to the forward end of a rod 25. The flexible elements are secured to the clips 15 and the rod 25 is slidably mounted in a bracket 26 carried by the chassis and has a pin and slot connection with the brake rigging as shown at 27. The rod 25 includes a pair of sections adjustably connected by a turn buckle 28 whereby the length of the rod may be varied and also permits the device to be properly adjusted for operation in conjunction with the brake rigging 6.

A bracket 29 is secured to the chassis and has pivoted thereto an arm 30 one end of which is pivoted to a link 31 having a pin and slot connection 32 with the throttle rod 8 while the other end of the arm 30 is adapted to be engaged by a lug 33 secured to the rod 25. With the rod 25 connected to the brake rigging 6 by the pin and slot connection 27 and the pin and slot connection 32 between the links 31 and the throttle rod 8, the brakes and speed of the engine can be controlled in the usual way without affecting or moving the rod 25.

In case of a collision, the impact on any part of the outer bar 10 of the bumper 9 causes a pull on the flexible elements 24 which moves the rod 25 forwardly exerting a pull on the brake rigging applying the brakes and simultaneously closing the throttle valve of the engine. When the pressure on the outer bar 10 is removed, the latter returns to its initial position by the influence of the springs 17.

As shown in Figures 1 and 3 the ends of the rods 13 attached to the outer bar 10 of the bumper are covered by ornamental plates 38.

While I have shown and described the preferred embodiment of my invention, it will be understood that minor changes in construction, combination and arrangement of parts may be made without departing from the spirit and scope of the invention, as claimed.

Having thus described my invention, what I claim is:

1. A device of the character set forth comprising a protecting member including pivotally connected bars, means for connecting the member to a motor vehicle, a cushioning means between said bars, and means associated with the cushioning means and connected to the brake rigging of the motor vehicle and the throttle of the latter for applying the brakes and closing the throttle when an impact is received by the protecting member.

2. A device of the character set forth comprising a protecting member including pivotally connected bars, a combined cushioning and securing means attaching the member to a motor vehicle, cushioning means between said bars, means connecting the cushioning means to the brake rigging and throttle of the motor vehicle for applying the brakes and closing the throttle when an impact is received by the protecting member.

3. A device of the character set forth comprising a protecting member including spaced pivotally connected bars, means connecting the member to a motor vehicle, rods secured to one of the bars and slidably connected to the other bar, cushioning means on said rods between the bars, and means connecting the rods to the brake rigging and throttle of the motor vehicle for applying the brakes and closing the throttle when an impact is received by the protecting member.

4. A device of the character set forth comprising a protecting member including bars pivotally connected, means connecting the member to a motor vehicle, rods detachably secured to one of the bars and slidable through the other bar, tension means on said rods and bearing against the bars, flexible means connecting said rods, and means connecting the flexible means to the brake rigging and throttle of the motor vehicle for applying the brakes and closing the throttle when an impact is received by the protecting member.

5. A device of the character set forth comprising a protecting member including movably connected bars, means connecting the member to a motor vehicle, rods secured to one of said bars and slidable through the other bar, tension means between said bars and mounted on the rods, covers for said tension means mounted on said rods and engaging one of the bars and slidable through the other bar, and means for connecting the rods to the brake rigging and throttle of the motor vehicle for applying the brakes and closing the throttle when an impact is received by the protecting member.

6. A device of the character set forth comprising a protecting member including inner and outer bars, means movably connecting the bars, means connecting the inner bar to a motor vehicle, rods detachably secured to the outer bar and slidable through the inner bar, tension means between said bars and mounted on the rods, flexible elements connected to the rods, guides on the inner bar for the flexible elements, and means connecting the flexible elements to the brake rigging and throttle of the motor vehicle for applying the brakes and closing the throttle when an impact is received by the protecting member.

7. A device of the character set forth comprising a protecting member, yieldable means carried by the protecting member, means connecting the protecting member to a motor vehicle, a slidably mounted rod carried by the motor vehicle and connected to the yieldable means and to the brake rigging of the motor vehicle, a pivotally mounted arm connected to the throttle of the motor vehicle, and a lug carried by the rod to engage said arm for causing the closing of the throttle and the application of the brakes when an impact is received on the protecting member.

In testimony whereof I affix my signature.

FRANK DI TRAPANI.